United States Patent [19]
Scheipner et al.

[11] 3,848,464
[45] Nov. 19, 1974

[54] UNDERWATER MEASURING BUOY SYSTEM

[75] Inventors: Robert Hans Scheipner, Dusseldorf-Vennhausen; Helmut Schlussler, Holzbuttgen; Raimund Germershausen, Kaarst, all of Germany

[73] Assignee: Firma Rheinmetall GmbH, Dusseldorf, Germany

[22] Filed: Mar. 7, 1973

[21] Appl. No.: 338,969

[30] Foreign Application Priority Data
Mar. 9, 1972 Germany............................ 2211333

[52] U.S. Cl. .................................. 73/170 A, 9/8 R
[51] Int. Cl. ........................ G01d 1/00, B63b 21/52
[58] Field of Search...... 73/170 R, 170 A, 188, 189; 9/8 R; 114/235 B

[56] References Cited
UNITED STATES PATENTS

| | | | |
|---|---|---|---|
| 2,756,404 | 7/1956 | Anderson et al. | 73/170 A |
| 3,191,202 | 6/1965 | Handler | 9/8 R |
| 3,314,009 | 4/1967 | Murdock | 73/170 A |
| 3,352,154 | 11/1967 | Djorup | 73/189 |

*Primary Examiner*—Donald O. Woodiel
*Assistant Examiner*—Anthony V. Ciarlante

[57] ABSTRACT

An auxiliary device to be applied under water for the determination of physical or chemical characteristics in waters, which comprises a measuring buoy-system. A device for retaining floating in a predetermined immersion depth the measuring buoy-system. The latter comprises a plurality of cylindrical and prismatic cells, respectively, jointed to a unit, for reception of measuring devices.

7 Claims, 7 Drawing Figures

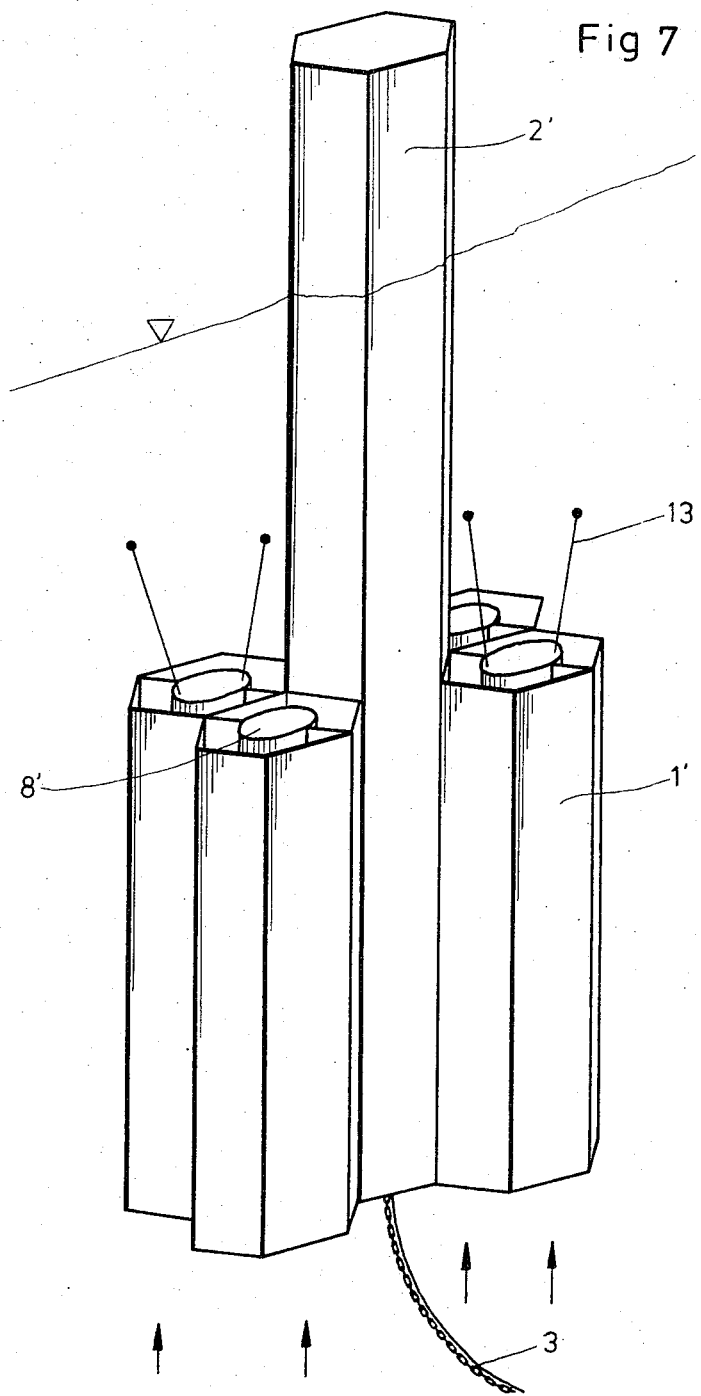

UNDERWATER MEASURING BUOY SYSTEM

The present invention relates to an underwater measuring buoy system in general and to an auxiliary device to be applied under water for the investigation of different physical or chemical characteristics, respectively, in waters, in particular.

Within the framework of research and of the protection of the surrounding world, the investigation and establishment of different physical or chemical dimensionless groups, respectively, in waters are of importance, and in particular in the sea, as well as also in inland waters. This is performed by sensors exposed under water, which sensors are connected over conduits with corresponding measuring devices.

The establishment of these dimensionless groups by the use of research vessels is known, which is, however, very expensive, and therefore is applicable in a few waters only. Furthermore, devices lowered under water stationary are known, in which the determined dimensionless groups are recorded. The devices are secured thereby to particular scaffolds or the like. In reasonable time spaces the devices must be brought in to obtain the stored data, whereupon the devices are again submerged and secured, which is likewise very expensive.

It is one object of the present invention to provide an auxiliary device, which does not require such comprehensive attendance labors and thus is applicable in an economic manner and in different submerging depths.

The auxiliary device to be applied under water for the investigation of physical or chemical dimensionless groups is characterized in accordance with the present invention by a measuring buoy-system maintained floating in a desired immersed depth, which system consists of a plurality of cylindrical or prismatic cells, respectively, combined to one unit for reception of the measuring devices and the like.

The device forming in this manner an under water-measuring buoy-system is secured by means of a chain to a bottom anchor and safeguarded thereby against drift. During application in inland waters, as rivers, lakes and storage-basins, the energy supply of the buoy-system takes place by a cable, which leads suitably as a plug connection from the bottom anchor, which is connected with an energy source disposed on land, to the device.

In the same manner takes place the transmission of the established data from the measuring buoy-system to an acceptance-or receiving-station which may be under circumstances far distant.

In this manner the possibility is given, to determine immediately the occurence of critical values, by example for the gain of drinking water and to take suitable counter measures and to determine under circumstances the cause.

During application of the underwater-measuring buoy-system on the sea, the transmission of data takes place by radio, for which purpose the device is equipped with a suitable sender.

The cells of the measuring buoy-system have suitably a cylindric or prismatic cross-section. Particularly advantageous is a hexagonal cross-section, whereby the cells are capable to be assembled to a cell unit resembling a honeycomb and whereby a very simple widening possibility results for the buoy-system, in which depending upon the range of the dimensionless groups to be determined, any number of cells can be combined to a unit.

For the use of the measuring buoy-system in standing waters advantageously a vertical arrangement of the cells is provided, whereby suitably in the symmetry axis of the cells a buoyancy body is provided. With this type of structure the advantage results, that a prevailing natural heat-convection makes superfluous, on the one hand, particular means for axial streaming through of the cells, and, on the other hand, makes possible very exact measuring data.

For the use in flowing waters, however, a structure type with horizontally disposed cells is preferred. Depending upon the strength of the flow, the device is equipped with guide and/or stabilization fins. The keeping of a predetermined immergence depth is controlled by the dimensions of the buoyancy body as well as by the arrangement of ballast weights. The latter are placed advantageously in particular ballast chambers provided in the cells.

With these and other objects in view, which will become apparent in the following detailed description, the present invention, which is shown by example only, will be clearly understood in connection with the accompanying drawings, in which:

FIG. 7 is a perspective view of a unit consisting of four open cells in vertical arrangement.

Figure 1:
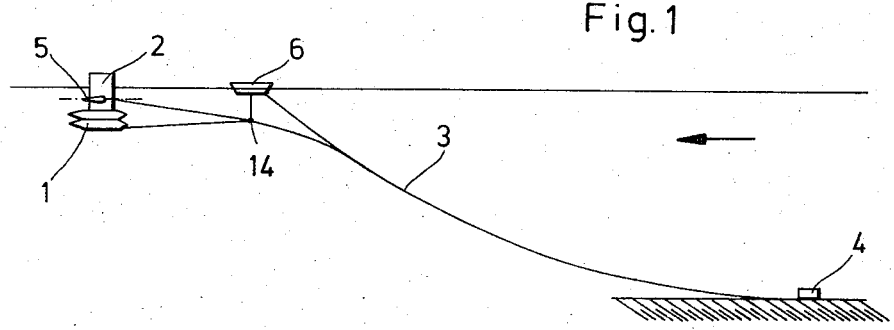
FIGS. 1 and 2 are schematic showings of the measuring buoy-system in two buoyancy depths in a flowing water.

Referring now to the drawings, and in particular to FIG. 1, a measuring buoy-system is disclosed in a flowing water. The buoy-system consisting of cells 1 and a buoyancy body 2 is secured to a bottom anchor 4 by means of a cable or chain 3, respectively. The bottom anchor 4 is connected by means of an electric cable with a land station. This cable serves the feeding of the required electric energy to the measuring devices disposed in the cells as well as the transmission of the measuring data. The cable leading from the bottom anchor to the measuring buoy is carried by the anchor chain 3.

Figure 2:
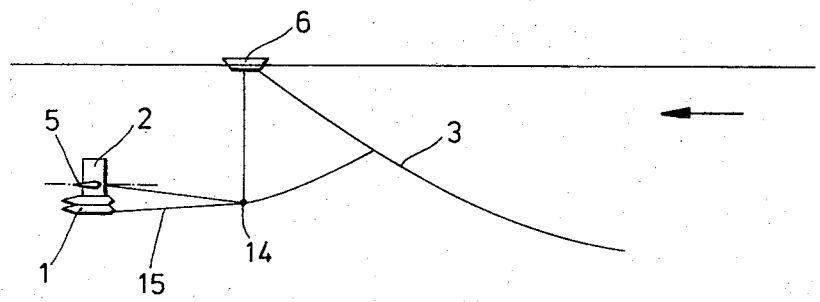

The stabilization of the immersion depth can take place purely statically in standing waters, statically and/or dynamically, without particular energy feed, in flowing waters. The static control is assumed in this case by the buoyancy body 2 breaking through the water line, whereby the measuring ballast and displacement makes possible a depth indication. The dynamic control of the immersed depth takes place in combination with a fixed point 14 premounted to the measuring buoy-system in nominal immersion depth, which fixed point 14 is connected suitably with the measuring buoy by a three point pull (Hahne-pot) 15, as well as stabilization fins 5 provided on the buoyancy body. Upon deviation from the nominal immersion depth ascending or descending forces, respectively, are produced on the buoyancy body due to the trimming controlled by the fixed point, whereby the measuring buoy-system is retained in the desired nominal immersion depth (FIGS. 1 and 2).

Advantageously the mentioned fixed point 14 is arranged by means of a supporting buoy 6 secured likewise on the anchor chain 3. The electric cable terminates then suitably in the supporting buoy, to which the measuring buoy-system is connected by a plug connection. In this manner the measuring buoy-system can be removed very simply and without applying a diver upon release of the electric plug connection and the mechanical connection on the lifted fixed point for repair- or overhaul-purposes. The support buoy can serve, however, also for the reception of energy cells for the current supply of the measuring system.

Figure 4:
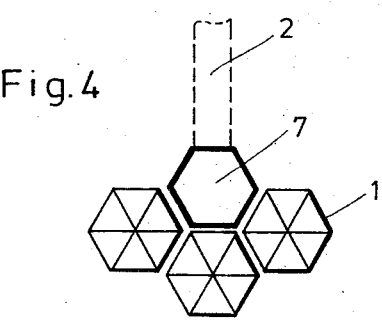
FIGS. 4 and 5 are schematic showings of the arrangement of a unit consisting of three and five cells, respectively.
Figure 5:
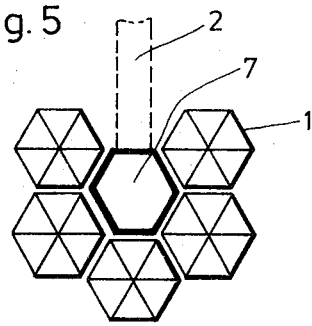
Figure 3:
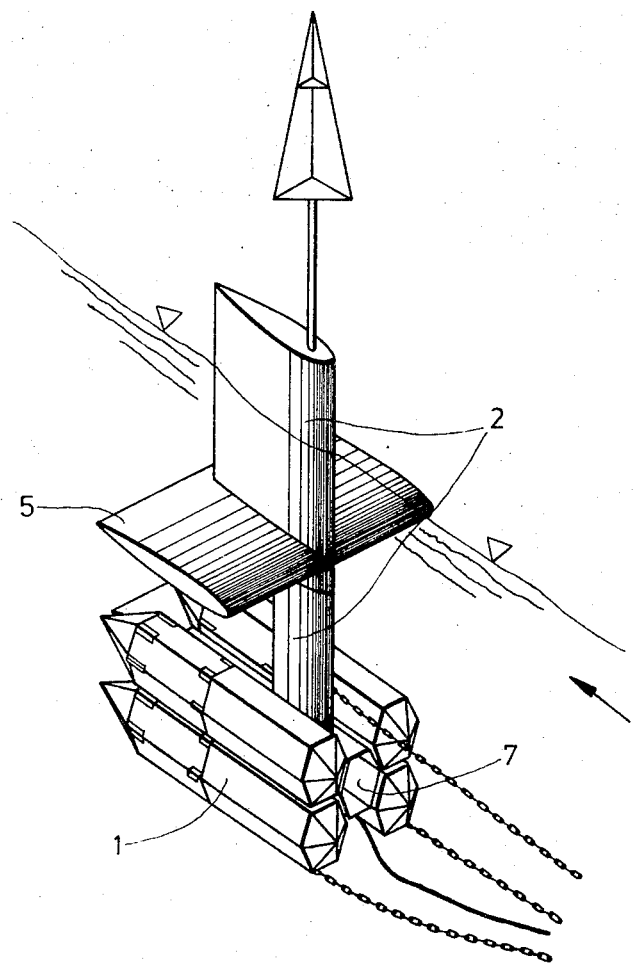
FIG. 3 is a perspective view of a unit consisting of four cells with horizontal cell arrangement with a buoyancy body.

By the measuring buoy-system shown in FIG. 3 four cells 1 are disposed about a central body 7 dashed through by water. The cells 1 and the central body 7 have a hexagonal cross-section and are set resembling a honeycomb relative to each other, in which the cells are secured to the side faces of the central body or adjacent cells, respectively. In this manner the measuring buoy-system can be complemented with further cells, or in a comparatively simple manner an exchange of cells is possible, respectively. (FIGS. 4 and 5 show two examples of arrangements of the cells.)

The central body contains the mechanical and electrical leading-ins for connection of the sensors to their electronic structure groups, as well as a part of the mechanical connections for coupling of the individual cells. In the individual cell is provided for one sensor the preamplifier and further electronics for the production of analogue signals corresponding with measuring values.

The buoyancy body 2 is provided in the symmetry plane on the central body, on which buoyancy body 2 are arranged stabilization fins 5 in suitable form and position. For the application in flowing waters the buoyancy body will have suitably a stream-favorable shape. Also one can design advantageously the stabilization fins as hollow bodies, which in this manner form a part of the volume of the buoyancy body and contribute to the weight stability. Comparatively small dimensions are obtained thereby.

Figure 6:
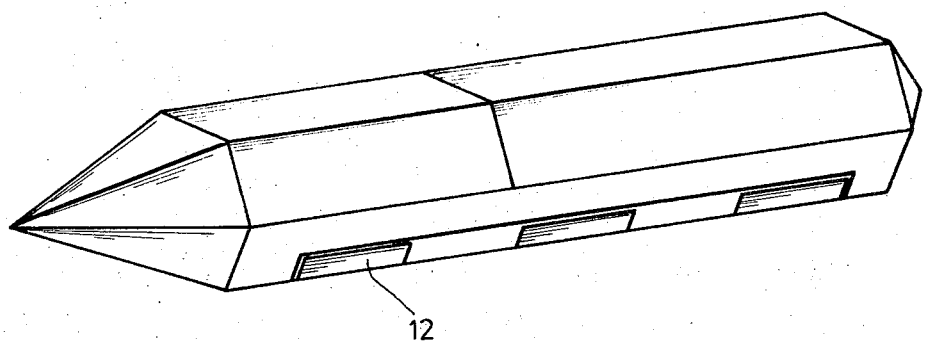
FIG. 6 is a perspective exploded view of a cell unit in closed construction.
Figure 6:
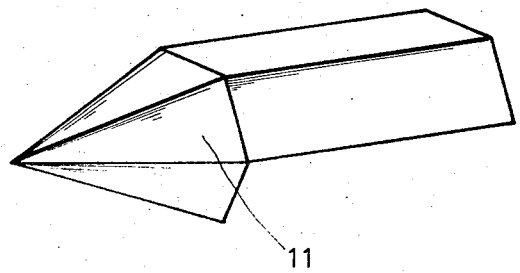
Figure 6:
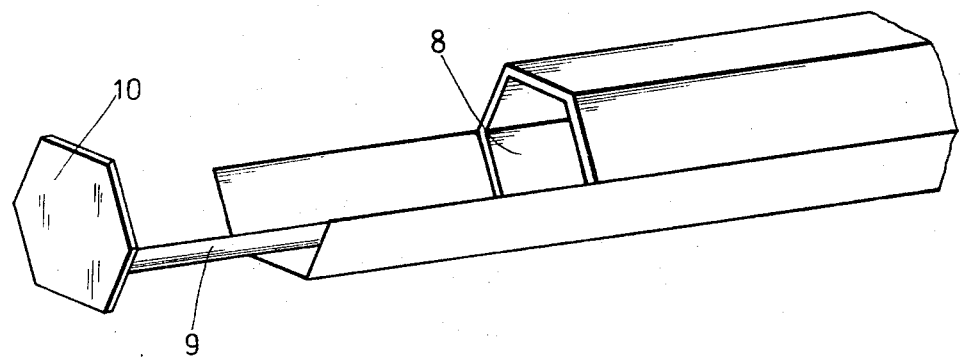

The cells can, as shown in FIG. 7, be performed in an open structure, or, as recognizable in FIGS. 3 and 6, in a closed structure. The latter is to be preferred in systems consisting of a plurality of cells and applied in flowing waters. The structure of such cell is schematically shown in FIG. 6. The cells have a head part and a stern part designed favorable for streaming.

Advantageously the head part of the cells is formed pyramid like, whereby, in particular visible from the structure of FIG. 5, a funnel effect is brought about, so that the central body freely streamed through is arranged in a zone of increased velocity in a blower stream.

The forward part of the cell serves as useful chamber 8 for reception of the electric and electronic devices. The latter can be mounted on a carrier 9, which slides into the useful chamber 8 like a drawer. A wall 10 closes then sealingly the useful chamber 8. Then the stern part 11, which is connected with a cell wall part, is mounted and connected in suitable manner with the remaining cell part. The space disposed in front of the stern part 11 is not sealed as a flowing-through chamber. The devices mounted on the carrier 9 are connected by means of conduits to plug connections disposed in the wall, wherefrom conduits (not shown) lead to sensors, which terminate in the central body 7 which is streamed through by water.

By a guide rail disposed in front of the central body it is prevented that larger foreign bodies can penetrate. The lower part of the cells is designed as likewise flow-through ballast-chamber and serves the reception of ballast weights 12.

FIG. 7 shows a measuring buoy-system especially for use in standing waters, as by example, storage basins, with vertical arrangement of the cells. The cells 1' are here designed in open structure. The natural heat convection mostly present in standing waters causes thereby, that in the cells a slight upward stream is produced. The cells have a hexagonal cross-section and are secured to the wall faces of the buoyancy body 2' designed likewise with hexagonal cross-section. Inside of the cells are arranged the useful chambers 8', the sensors of which either project as free sensors from the cells or are disposed in the flow-through space between the useful chamber and the wall of the cell. The measuring buoy-system is suitably likewise secured by means of a chain to a bottom anchor, which is connected over a cable with a land station and from which a further cable, which is carried by the chain, leads to the buoy-system.

In case for obtaining certain measuring data a larger axial flow through of the cells is desired, one can provide, particularly with cells in open structure, a propeller driven by a motor at one end of the cells. In application in flowing waters with a comparatively strong stream the arrangement of a generator is possible, which, driven by a propeller by the stream, delivers the energy required for the operation of the electric measuring devices.

As a working material for the measuring buoys, as well as the buoyancy body essentially glass fiber fortified synthetic material (GFK) or integral froth is used. These working materials are characterized by a low submission to corrosion and a low specific weight. The latter is particularly advantageous for the handling during attendance of the buoy or the displacement of the measuring place, respectively, as well as during exchange of individual cells. Beyond that the rigidity of the working material in each case is sufficient, so that all mechanical loads occuring can be carried without danger for the buoy body. Furthermore the smooth surface of the working material guarantees the best possible protection against growth and soiling.

All above disclosed statments and features, in particular the disclosed spatial formation and constructive design, are claimed as essential for the present invention, as much as they are novel relative to the status of the prior art individually or in combination.

While we have disclosed several embodiments of the present invention, it is to be understood that these embodiments are given by example only and not in a limiting sense.

We claim:

1. An auxiliary device to be applied under water for the determination of physical or chemical characteristics in waters, comprising
    a measuring buoy-system,
    means for retaining floating in a predetermined immersion depth said measuring buoy system, said measuring buoy system comprising a plurality of prismatic cells, disposed parallel relative to each other and arranged about a common symmetry axis joined to a unit, for reception of measuring devices, said cells being disposed symmetrically about a central body flown through the water, sensors disposed in said cells and including stabilization fins with said fins being disposed horizontally.

2. The underwater measuring buoy-system, as set forth in claim 1, for the use in flowing waters, wherein said cells are disposed in substantially horizontal arrangement.

3. The underwater-measuring buoy-system, as set forth in claim 1, which includes a buoyancy body adapted to break through the water surface and causing a lifting force, to bring about a static immersion depth stabilization.

4. The underwater-measuring buoy-system, as set forth in claim 3, wherein said buoyancy body has a streamlined cross-section.

5. The underwater-measuring buoy-system, as set forth in claim 2, which includes an anchoring fixed point coordinated to said device in nominal immersion depth, to bring about a dynamic immersion depth stabilization.

6. The underwater-measuring buoy-system, as set forth in claim 1, wherein said cells have a hexagonal cross section and are composable to a cell unit and resembling a honeycomb.

7. The underwater-measuring buoy-system, as set forth in claim 1, wherein said cells have in addition to a useful chamber and a flow-through chamber a ballast space.

* * * * *